Nov. 5, 1929.  E. E. WEMP  1,734,101
CLUTCH
Filed Jan. 14, 1927
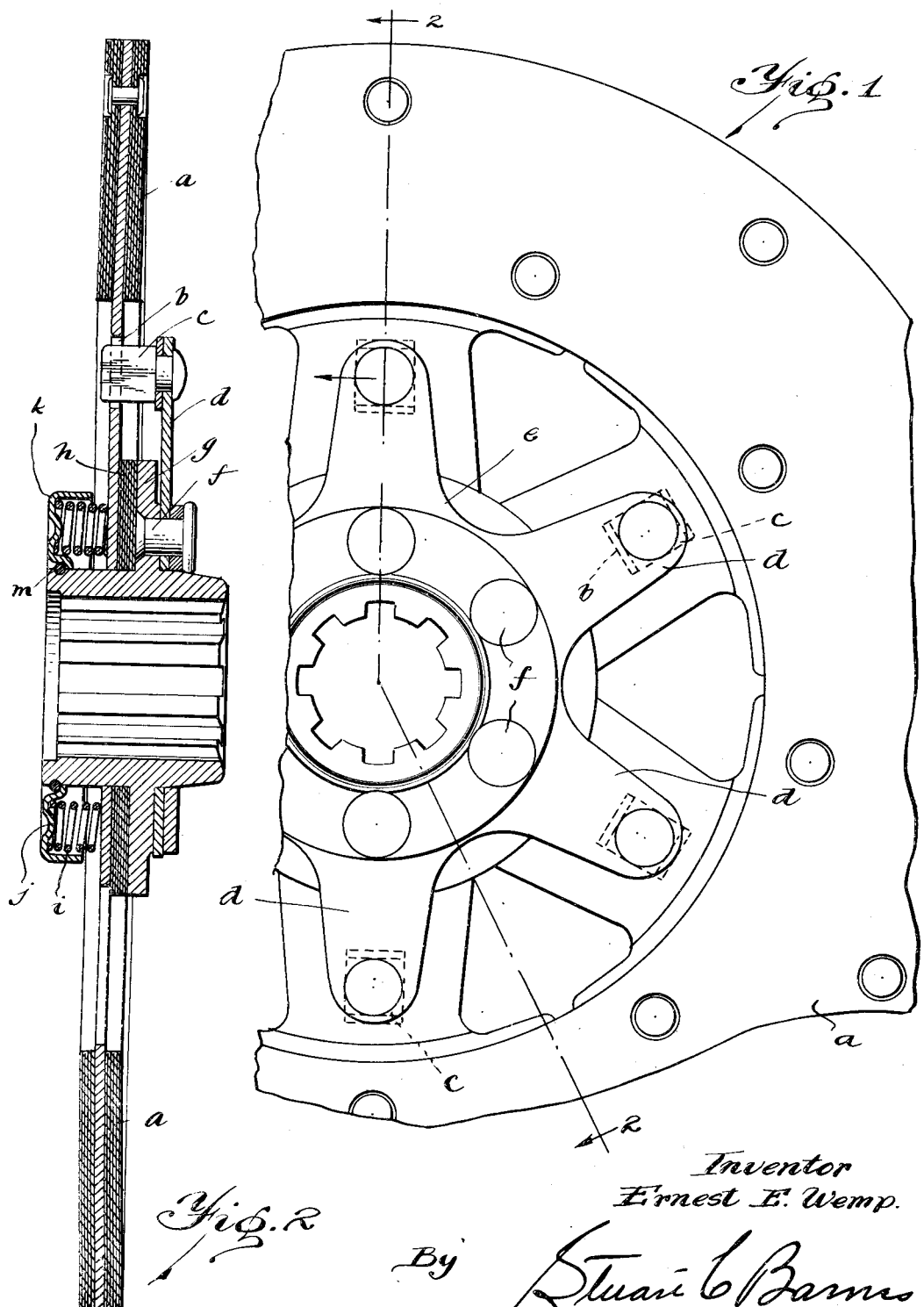
Inventor
Ernest E. Wemp.
By Stuart C Barnes
Attorney Patented Nov. 5, 1929

1,734,101

UNITED STATES PATENT OFFICE

ERNEST E. WEMP, OF DETROIT, MICHIGAN

CLUTCH

Application filed January 14, 1927. Serial No. 161,031.

This invention relates to clutches, and it has for its object an improved clutch construction in which an arrangement is provided and devices are provided for permitting a small amount of relative movement between the driven disc and its hub. This movement is resisted by a braking member which tends to eliminate vibrations.

This general combination is described and broadly claimed in my application Serial No. 158,507, executed December 27, 1926. The present construction is a modification of the generic invention there described and claimed. This application has matured into Patent No. 1,700,244, dated January 29, 1929.

This construction is more particularly intended for single plate clutches and a cheaper style of clutch, although neither type of vibration damper needs to be associated with a clutch of any definite number of plates, as either could be slightly modified to accommodate itself to a different number of clutch plates.

Referring to the drawings:

Fig. 1 is an end elevation showing in elevation the driven elements of the clutch.

Fig. 2 is a section taken on the line 2—2 of Fig. 1.

$a$ designates a driven disc preferably of the spoked variety. Each of the spokes is provided with a slot $b$ in which are located the driving blocks $c$ attached to the torsion arms $d$ of the spider plate $e$, which is riveted or bolted as at $f$ to the hub flange $g$. Between the center of the spoked disc and the hub flange is a brake washer $h$, or it may be a brake lining or facing secured to either of these members.

Coil springs $i$ centered by the depressions $j$ in the cup-like plate $k$ press the driven disc, the braking washer, and the flange together, and consequently tend to resist relative movement. The split ring $m$ holds the cup-like member $k$ in place.

It will be apparent that the torsion arms $d$ on the spider can twist to a certain extent permitting relative movement between the hub flange and the driven disc, but storing up potential energy in which to return the parts to their initial position when the sudden change of load is relieved. These torsion arms, therefore, act as spring members to resist and limit relative movement, and consequently relieve the shock. However, alone, they are not very capable of absorbing and snubbing vibrations. This is effected by the braking action afforded by the braking washer or lining.

This construction has the same general principles as that described and claimed in the application to which I have already referred. However, it is simpler and cheaper to manufacture. It does not have the decrease of leverage in communicating the change of load referred to in my prior application, and also it does not have the adjustable friction action that is possible in my prior application. Furthermore, the torsion arms are carried on a separate element, instead of being part of the driven disc.

What I claim is:

1. In a clutch, the combination of a clutch member, a second clutch member on which the same is mounted, and a coupling member for limiting the relative movement comprising a spider provided with torsion arms which are twisted by a sudden change of load, to thereby limit the amount of relative movement and store up energy to return the parts to their initial position when the load is relieved.

2. In a clutch, the combination of a driven disc, a hub on which the driven disc is rotatably supported, and a spider secured to the hub having arms connected with the driven disc, said arms being adapted to yield to provide for limited relative movement between the disc and hub, and a braking element for resisting said relative movement.

3. In a clutch, a hub, a driven disc rotatably supported on the hub, and a spider secured to the hub and having torsion arms twistable on a radial axis and secured to the disc for the purpose specified.

4. In a clutch, a hub provided with a hub flange, a disc rotatably supported on the hub, a spider clamped to the hub flange and provided with torsion arms twistable on a radial axis and engaging with the disc and arranged to operate in the manner specified.

5. In a clutch, the combination of a driven disc, a hub on which the disc is rotatably mounted and provided with a hub flange, a braking material between the center of the disc and the hub flange, a spring abutment supported on the hub, and a plurality of coil springs for pressing the disc, the braking material, and the hub flange together, and a coupling between the hub and disk comprising torsional metallic members for permitting only a limited relative movement between the hub and disk.

In testimony whereof I affix my signature.

ERNEST E. WEMP.